(12) United States Patent
Mahboubi et al.

(10) Patent No.: US 11,787,535 B2
(45) Date of Patent: Oct. 17, 2023

(54) ONLINE OPTIMIZATION-BASED FLIGHT CONTROL SYSTEM

(71) Applicant: Wisk Aero LLC, Mountain View, CA (US)

(72) Inventors: Zouhair Mahboubi, Palo Alto, CA (US); Gabe Hoffmann, Mountain View, CA (US); Olivier Toupet, Stevenson Ranch, CA (US); Herve Martins-Rivas, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 91 days.

(21) Appl. No.: 17/325,629

(22) Filed: May 20, 2021

(65) Prior Publication Data
US 2021/0362847 A1 Nov. 25, 2021

Related U.S. Application Data

(63) Continuation of application No. 16/441,642, filed on Jun. 14, 2019, now Pat. No. 11,034,441, which is a continuation of application No. 15/297,029, filed on Oct. 18, 2016, now Pat. No. 10,370,099.

(51) Int. Cl.
| | | |
|---|---|---|
| *B64C 29/00* | (2006.01) | |
| *G05D 1/08* | (2006.01) | |
| *B64C 27/28* | (2006.01) | |
| *G05D 1/10* | (2006.01) | |

(52) U.S. Cl.
CPC .............. *B64C 29/00* (2013.01); *B64C 27/28* (2013.01); *B64C 29/0025* (2013.01); *G05D 1/085* (2013.01); *G05D 1/0808* (2013.01); *G05D 1/101* (2013.01); *G05D 1/102* (2013.01)

(58) Field of Classification Search
CPC ..... B64C 29/00; B64C 29/0025; B64C 27/28; G05D 1/0808; G05D 1/085; G05D 1/101; G05D 1/102; G05D 1/0858
See application file for complete search history.

(56) References Cited

U.S. PATENT DOCUMENTS

| | | |
|---|---|---|
| 4,469,294 A | 9/1984 | Clifton |
| 7,255,306 B2 | 8/2007 | Jones et al. |
| 8,523,102 B2 | 9/2013 | Shue et al. |
| 8,800,912 B2 | 8/2014 | Oliver |
| 9,908,616 B1 | 3/2018 | Horn et al. |
| 10,370,099 B2 | 8/2019 | Mahboubi et al. |
| 2004/0107013 A1 | 6/2004 | Fuller et al. |
| 2012/0095621 A1 | 4/2012 | Zhu et al. |

(Continued)

OTHER PUBLICATIONS

U.S. Appl. No. 15/297,029 , "Notice of Allowance", dated Mar. 28, 2019, 9 pages.

(Continued)

*Primary Examiner* — Michael J Zanelli
(74) *Attorney, Agent, or Firm* — Kilpatrick Townsend & Stockton LLP

(57) ABSTRACT

Techniques to control flight of an aircraft are disclosed. In various embodiments, a set of inputs associated with a requested set of forces and moments to be applied to the aircraft is received. An optimal mix of actuators and associated actuator parameters to achieve to an extent practical the requested forces and moments is determined.

25 Claims, 11 Drawing Sheets

(56) References Cited

U.S. PATENT DOCUMENTS

| | | |
|---|---|---|
| 2014/0209751 A1 | 7/2014 | Stagmer |
| 2017/0121034 A1 | 5/2017 | Fisher et al. |
| 2017/0153650 A1 | 6/2017 | Chang et al. |
| 2019/0291862 A1* | 9/2019 | Lyasoff ................. G05D 1/102 |

OTHER PUBLICATIONS

U.S. Appl. No. 16/441,642 , "Notice of Allowance", dated Feb. 18, 2021, 9 pages.

* cited by examiner

ONLINE OPTIMIZATION-BASED FLIGHT CONTROL SYSTEM

CROSS REFERENCE TO OTHER APPLICATIONS

This application is a continuation of U.S. patent application Ser. No. 16/441,642, entitled ONLINE OPTIMIZATION-BASED FLIGHT CONTROL SYSTEM filed Jun. 14, 2019, which is a continuation of U.S. patent application Ser. No. 15/297,029, now U.S. Pat. No. 10,370,099, entitled ONLINE OPTIMIZATION-BASED FLIGHT CONTROL SYSTEM filed Oct. 18, 2016, each of which is incorporated herein by reference for all purposes.

BACKGROUND OF THE INVENTION

Flight control systems (sometimes referred to as "flight controllers") translate inputs received from manually operated pilot controls, such as one or more of a roll stick, rudder pedals, pitch stick, collective, and throttle controls, etc., referred to collectively herein as "inceptors", and/or inputs from one or more sensors (e.g., air speed) into commands to the flight control assets of the aircraft, which may include one or more of control surfaces, such as rudders, ailerons, elevators, etc.; sources of forward thrust, such as propellers or jet engines; powered sources of lift such as rotors or lift fans; and forces capable of being directed or otherwise controlled or concentrated through use of nozzles, diverters, physical structures onto which engine or fan thrust may be directed, such as vanes, etc. and/or rotation of thrust generating devices.

Each of the foregoing, and/or other equipment and structures, may be used to affect one or more of the speed, direction, and attitude/orientation of the aircraft, and depending on the input each may be able to contribute to satisfying a command/input received via one or more inceptors. Aerodynamic control surfaces, powered sources of control forces, such as lift fans, and other structures capable of affecting aircraft attitude, motion, and/or orientation are referred to collectively herein as "actuators".

An aircraft typically is considered to have six degrees of freedom of movement, including forces in the forward/back, side/side, and up/down directions (corresponding to forces in three axes Fx, Fy, and Fz) and moments about the longitudinal (roll) axis, the transverse (pitch) axis, and the vertical (yaw) axis (corresponding to moments in three axes Mx, My, and Mz). If an aircraft has more actuators than degrees of freedom, it must be determined how the various actuators will be used to act on the aircraft in response to commands received via the inceptors or sensors. For a given set of one or more pilot commands under given circumstances, some combinations of actuators capable of acting on the aircraft to achieve the result indicated by the pilot command(s) may be more effective and/or efficient than others. For example, some may consume more or less power and/or fuel than others, provide a more smooth transition from a current state than others, etc. Even for systems that are not over-actuated, it is necessary to determine what combination of actuation commands results in the desired motion and how to manage saturation issues or enforce system constraints.

In prior systems, attempts have been made to pre-compute, offline, combinations of actuators and associated parameters (e.g., position, speed, other parameters) to respond to different combinations of inceptor input using heuristics and/or engineering judgement. However, typically it is not possible to determine in advance every combination of actuators and associated parameters that may be required under all possible conditions and circumstances.

BRIEF DESCRIPTION OF THE DRAWINGS

Various embodiments of the invention are disclosed in the following detailed description and the accompanying drawings.

DETAILED DESCRIPTION

Figure 1:
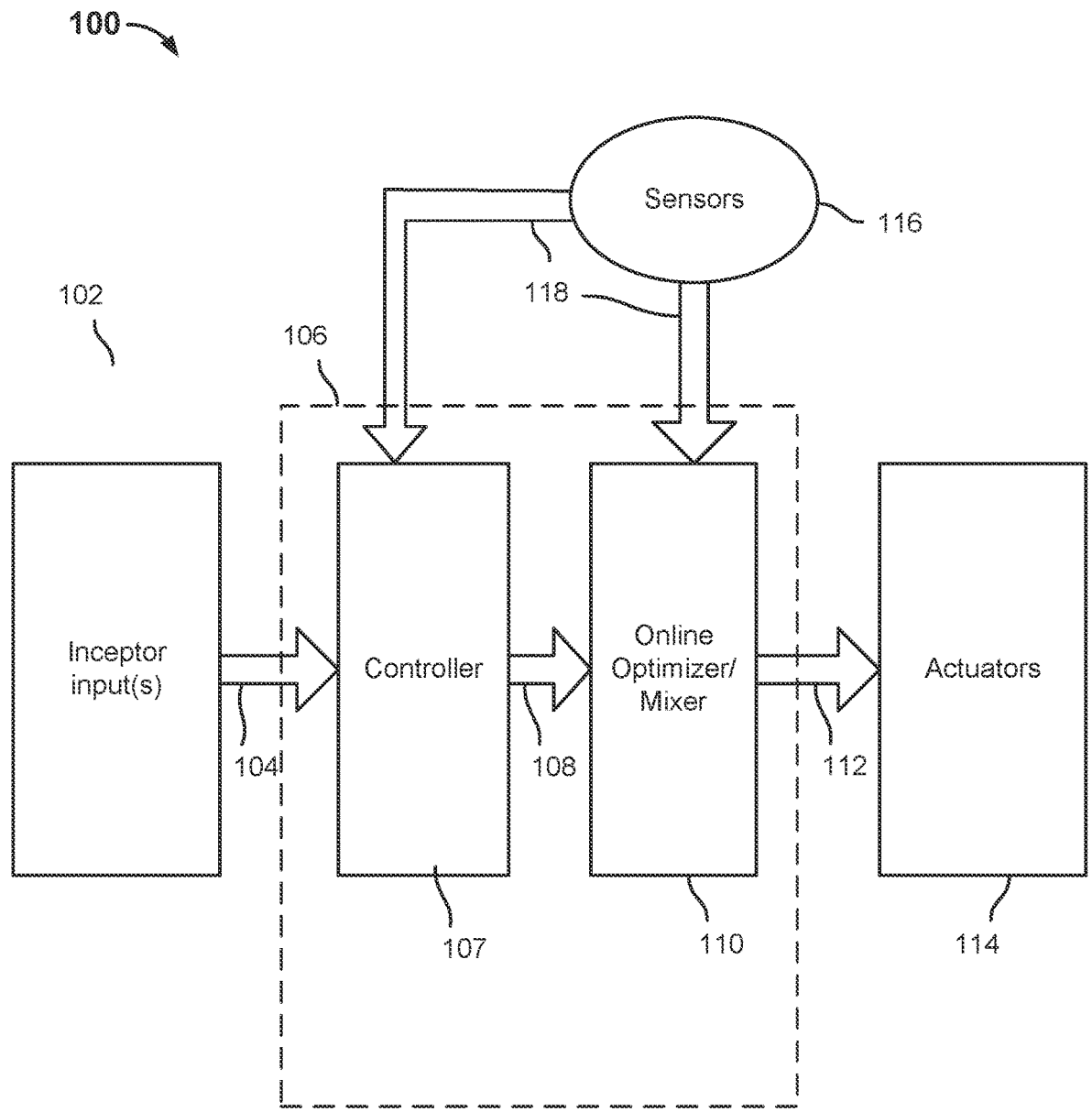
FIG. 1 is a block diagram illustrating an embodiment of a flight control system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A flight control system to perform online optimization is disclosed. In various embodiments, a flight control system as disclosed herein receives inceptor inputs, sensor inputs, and/or forces and moments to which such inceptor and/or sensor inputs have been mapped (mapping is static or includes time history of said p\inceptor and/or sensor inputs), and determines an optimal mix of actuators and associated actuator parameters (e.g., position, speed of rotation, etc.) to achieve (to an extent feasible) the requested forces and moments. In some embodiments, optimization may be performed at least in part by modeling one or more costs, such as battery power consumed to drive electric motor-driven lift fans and/or other rotors/propellers, time to move control surfaces, drag associated with control surfaces, etc. The model may be used onboard the aircraft, in real time (sometimes referred to herein as "online"), to determine an optimal set of actuators and associated parameters to achieve the requested forces and moments.

In various embodiments, costs may be modeled using linear terms to form an "objective" function. An optimization technique that finds a minimum of such an multi-dimensional objective function may be used to determine online (as opposed to relying on looking up a pre-computed solution) an optimal mix of actuators and associated parameters to provide the required forces and moments. In some embodiments, a 2-norm (e.g., "L2") or other norm (e.g., L1, infinity, etc.) or magnitude value of the objective function may be minimized, subject to one or more constraints (e.g., max available rotor torque). For example, the bounded-variable least-squares approach (BVLS) may be used to find the minimum L2 norm of a cost function with bounds on the design variables.

Upper and lower bounds may be set for actuators, such as maximum deflection and/or torque. The effect of the various actuators included in an aircraft on forces and/or moments along and/or about the respective axes of the aircraft (e.g., x, y, and z; longitudinal, transverse, and vertical; etc.) may be determined based on actuator attributes and aircraft geometry and may be embodied in a model and/or otherwise stored, e.g., in the form of a lookup table or matrix. In some embodiments, actuator effectiveness under different operating conditions (e.g., air speed, temperature, etc.) may be taken into consideration.

In some embodiments, the matrix, database, or other data structure may map actuator parameters to effectiveness for only some actuators, e.g., for lift fans but not aerodynamic control surfaces or a forward-flight propeller. In some embodiments, the effectiveness of aerodynamic surfaces under various conditions (e.g., airspeed) may be included in the model, along with lift fans and/or other actuators. For example, the dynamic pressure and/or other measure or representation of the effectiveness of aerodynamic control surfaces may be reflected in the actuator effectiveness matrix or other data structure or model.

In some embodiments, to the extent requested forces and moments cannot fully be satisfied, "error" terms (i.e., the difference between the requested force and/or moment for a given axis and the corresponding force/moment provided by a given mix of actuators and associated parameters) are modeled as a cost and an optimization is performed to minimize the collective error. In some embodiments, one or more axes may be favored in such optimizations, such as by assigning different weights to errors associated with different axes. For example, control in the x-y plane may be given precedence over other objectives, such as vertical thrust, by assigning relatively higher weights to errors in achieving requested moments about the pitch and roll axes.

In some embodiments, one or more constraints may be enforced, such as maximum power consumption, minimum and/or maximum motor speed and/or torque, control surface minimum and/or maximum deflection, actuator minimum and/or maximum rate of change, etc. Such constraints may be modeled and/or enforced as linear constraints in various embodiments. In some embodiments, constraints with respect to values that vary non-linearly in the solution range/space may be modeled as a set of linear constraints comprising a piecewise linear approximation of the non-linear constraint. In various embodiments, values that vary non-linearly, such as actuator effectiveness, may be approximated by linearizing (determining a linear approximation of) around the current operating point or a reference point nearby in the relevant state space. In various embodiments, representing/modeling constraints as linear constraints may simplify/speed computations and/or facilitate use of optimization techniques that are (best) able to enforce only linear constraints.

In various embodiments, one or more of a desired cost function, one or more constraints, and/or actuator effectiveness may vary based on vehicle (i.e., aircraft) state. For example, a cost function and/or a variable or other parameter may change based on factors such as temperature, airspeed, angle of attack, vehicle orientation, and system mode or state. In some embodiments, constraints may vary with one or more variables, such as airspeed, etc. Constraints may include constraints that render an actuator unavailable under certain conditions. One purpose for such variations in constraints may be, without limitation, to avoid excessive load on an airframe and/or associated actuators, such as lift fans and control surfaces. For example, at a certain forward velocity, lift fans intended to provide vertical or short takeoff and landing capability and/or an ability to hover may become unavailable. In some embodiments, constraints expressed as a maximum rate of actuator change (e.g., lift fan acceleration, aerodynamic control surface rate of angular change, etc.) may vary based on conditions or vehicle state. In some embodiments, the minimum and/or maximum available actuator commands may vary based on vehicle states. For example, detecting an actuator failure could result in setting the upper bound of an actuator command to zero. In some embodiments, relative prioritization weights between the different axes or between different actuators may vary with vehicle states.

FIG. 1 is a block diagram illustrating an embodiment of a flight control system. In the example shown, flight control system 100 includes a set of inceptors 102 configured to provide inceptor inputs 104 to a flight control computer 106 that includes a controller 107 and an online optimizer/mixer 110. In various embodiments, inceptors 102 may include manual input devices, such as stick, throttle, rudder, collective, joystick, thumb stick, and/or other manual control/input devices configured to be manipulated by a pilot or other operator to control the flight of an aircraft. Such inceptor devices and/or associated electronics may be configured to provide as input signals 104 one or more of a roll direction, roll rate, yaw direction, yaw rate, pitch angle, pitch rate, altitude, altitude rate and/or forward or other speed, position, and/or thrust input signal. In the example shown, controller 106 also receives sensor data 118, e.g., air speed, air temperature, air static pressure, acceleration(s), angular rates, GPS information, camera or other image data, etc., from sensors 116. Flight controller 106 translates, aggregates, and/or otherwise processes and/or interprets the received inceptor inputs 104 and/or sensor data 118 to generate and provide as output associated forces and/or moments 108 to be applied to the aircraft via its control assets (e.g., propellers, rotors, lift fans, aerodynamic control surfaces, etc.; sometimes referred to herein as "actuators") to maneuver the aircraft in a manner determined based at least in part on the inceptor inputs 104 and/or sensor data 118. In various embodiments, forces/moments 108 may include forces and/or moments along and/or about one or more axes of the aircraft, such as x, y, and z axes, corresponding to longitudinal, transverse, and vertical axes of the aircraft, respectively, in various embodiments.

Referring further to FIG. 1, the flight control system 100 includes an online optimizer/mixer 110 configured to receive forces/moments 108 as inputs. In some prior flight control systems, offline mapping may be used. For example, different combinations of forces/moments that may be called for during flight may be mapped in advance, e.g., using heuristics, engineering judgment, etc., to corresponding sets of actuators and associated actuator parameters (e.g., rpm, power, control surface angle, as applicable). In the example shown in FIG. 1, by contrast, online optimizer/mixer 110 receives as input forces/moments 108 and computes dynamically (online) a set of actuators and associated commands/parameters 112 to exactly minimize the desired cost function given the current state of the system. In the example shown, actuators 114 are configured to operate in response to actuator commands/parameters 112 provided by online optimizer/mixer 110.

In the example shown, sensors 116 provide sensor data 118 to online optimizer/mixer 110. Examples of sensors 116 and/or sensor data 118 may include one or more of airspeed, temperature, or other environmental conditions; actuator availability, failure, and/or health information; aircraft attitude, altitude, and/or other position information; presence/absence of other aircraft, debris, or other obstacles in the vicinity of the aircraft; actuator position information; etc. In various embodiments, online optimizer/mixer 110 may be configured to take sensor data 118 into account in determining an optimal mix of actuators and associated parameters to achieve a requested set of forces and moments. For example, in some embodiments, four or more lift fans may be provided to lift an aircraft into the air, enable the aircraft to hover, control aircraft attitude relative to the horizontal, etc. In some embodiments, failure of a lift fan may be reflected in sensor data 118, resulting in a seamless response by online optimizer/mixer 110, which provides an optimal set of actuators and parameters 112 that omits (does not rely on) the failed lift fan. Likewise, in some embodiments, sensor data reflecting diminished power/performance, overheating, etc., may be taken into consideration, such as by adjusting the actuator effectiveness model and/or the actuator constraints (e.g., minimum/maximum speed, torque, deflection, rate of change, etc.).

Figure 2A:
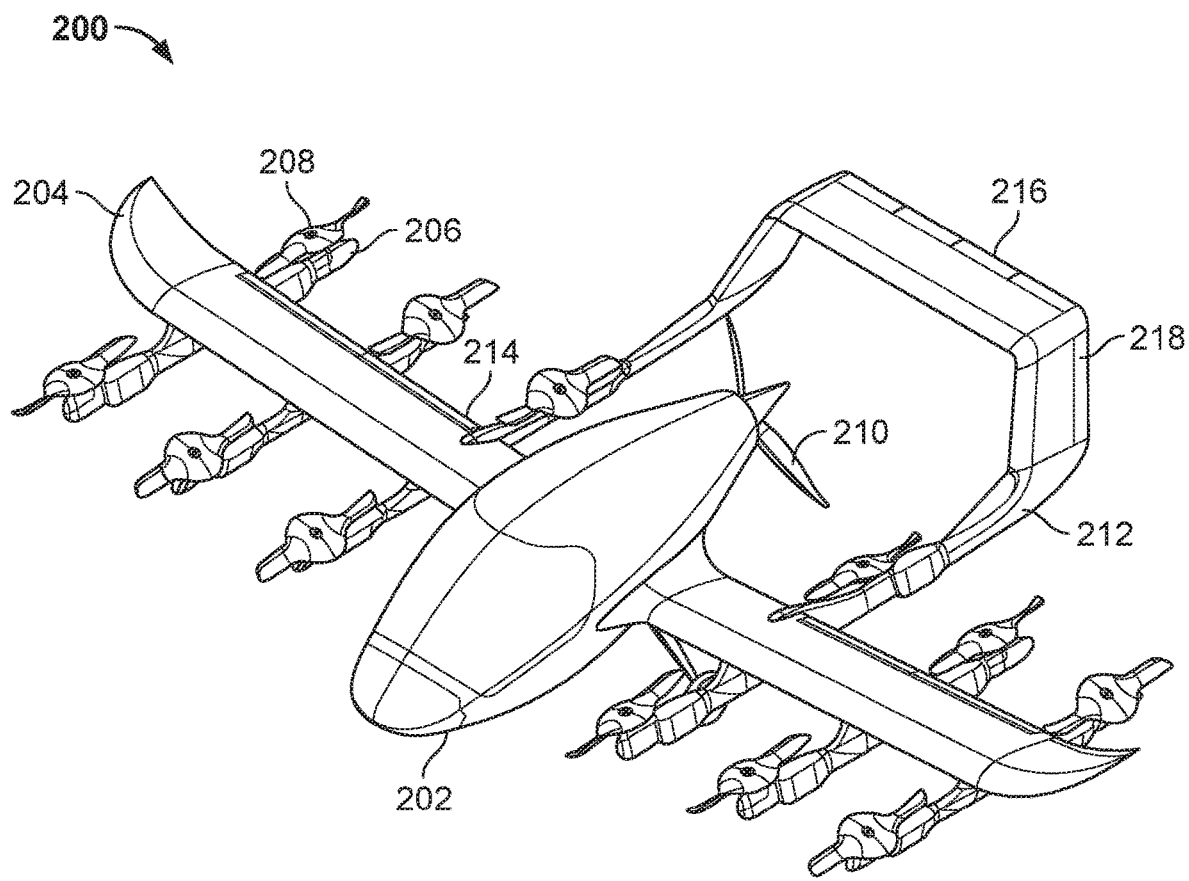
FIG. 2A is a diagram illustrating an embodiment of an aircraft comprising a flight control system.

FIG. 2A is a diagram illustrating an embodiment of an aircraft comprising a flight control system. In various embodiments, a flight control system such as flight control system 100 of FIG. 1 may be embodied in an aircraft such as aircraft 200 of FIG. 2A. In the example shown, aircraft 200 includes a fuselage (body) 202 and wings 204. A set of three underwing pylons 206 is provided under each wing. Each pylon 206 has two lift fans 208 mounted thereon, one forward of the wing and one aft. Each lift fan 208 may be driven by an associated drive mechanism, such as a dedicated electric motor. One or more batteries (not shown) and/or onboard power generators (e.g., solar panels) may be used to drive the lift fans 208 and/or charge/recharge onboard batteries.

Figure 2B:
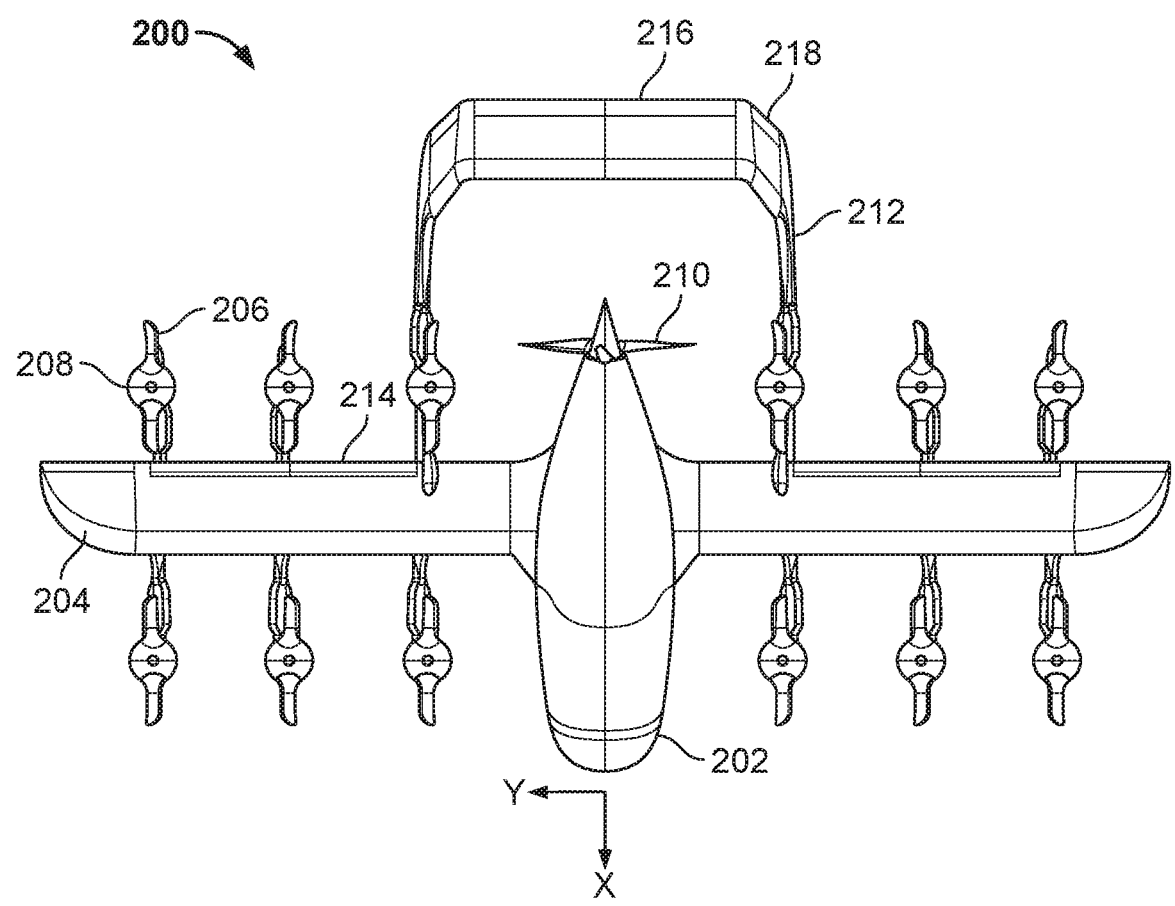
FIG. 2B is a diagram illustrating an embodiment of an aircraft comprising a flight control system.
Figure 2C:
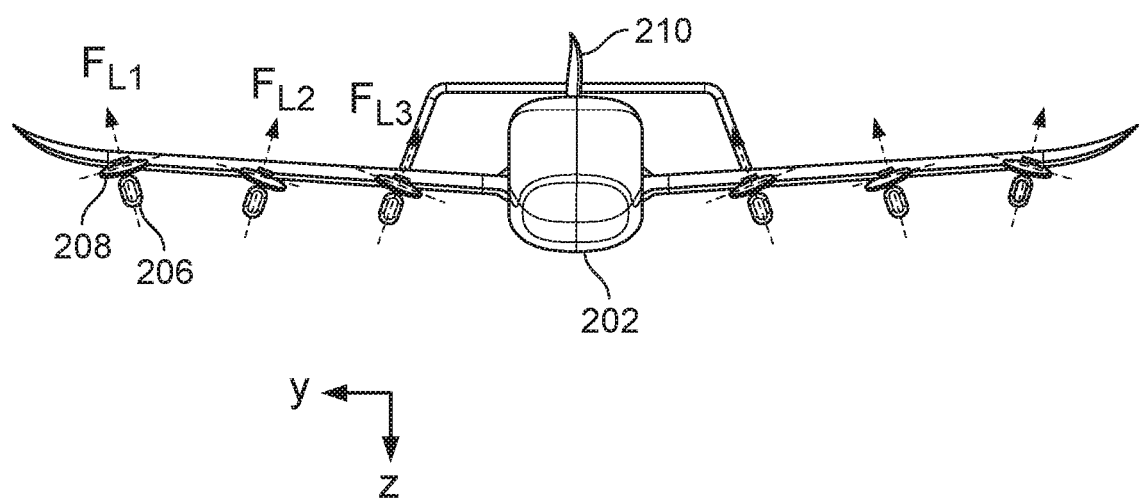
FIG. 2C is a diagram illustrating an embodiment of an aircraft comprising a flight control system.

In various embodiments, each pylon 206 is positioned at an angle relative to a vertical axis of the aircraft such that the lift fans 208 are mounted thereon at an associated angle, as described more fully in connection with FIG. 2C.

In the example shown in FIG. 2A, a propeller 210 is mounted on the fuselage 202 and configured to push the aircraft through the air in the forward (e.g., x axis) direction. The propeller 210 is positioned between a pair of booms 212 that extend aft and are joined at their aft end by a tail structure on which aerodynamic control surfaces including elevators 216 and rudder 218 are mounted. Additional control surfaces include ailerons 214 mounted on the trailing edge of wings 204.

FIG. 2B is a diagram illustrating an embodiment of an aircraft comprising a flight control system. In FIG. 2B, a top view off aircraft 200 of FIG. 2A is shown. Coordinate axes in the x (forward) and y (side) direction are indicated.

FIG. 2C is a diagram illustrating an embodiment of an aircraft comprising a flight control system. In FIG. 2C, a front view of aircraft 200 of FIG. 2A is shown. Coordinate axes in the z (vertical) and y (side) direction are indicated. The front view shown in FIG. 2C illustrates the respective angles of the vertical axis (z axis as labeled) at which the outboard, middle, and inboard pairs of lift fans 206 are oriented. In various embodiments, angling the lift fans, as indicated, may provide additional options to control the aircraft, especially at or near hover. For example, different combinations of fans may be used to exercise yaw control (e.g., rotate around z axis), to slip sideways or counteract the force of wind while in a hover (y axis), etc.

In various embodiments, the effective forces and moments capable of being provided by each respective lift fan may be stored onboard the aircraft 200 in a memory or other data storage device associated with the onboard flight control system. In various embodiments, a matrix, table, database, or other data structure may be used. In some embodiments, effectiveness under different operating conditions may be stored. For example, effectiveness of a lift fan or control surface may be different depending on conditions such as airspeed, temperature, etc. In some embodiments, forces and moments expected to be generated by a lift fan or other actuator under given conditions may be discounted or otherwise reduced, e.g., by a factor determined based at least in part on an environmental or other variable, such as a measure of lift fan motor health.

Figure 3:
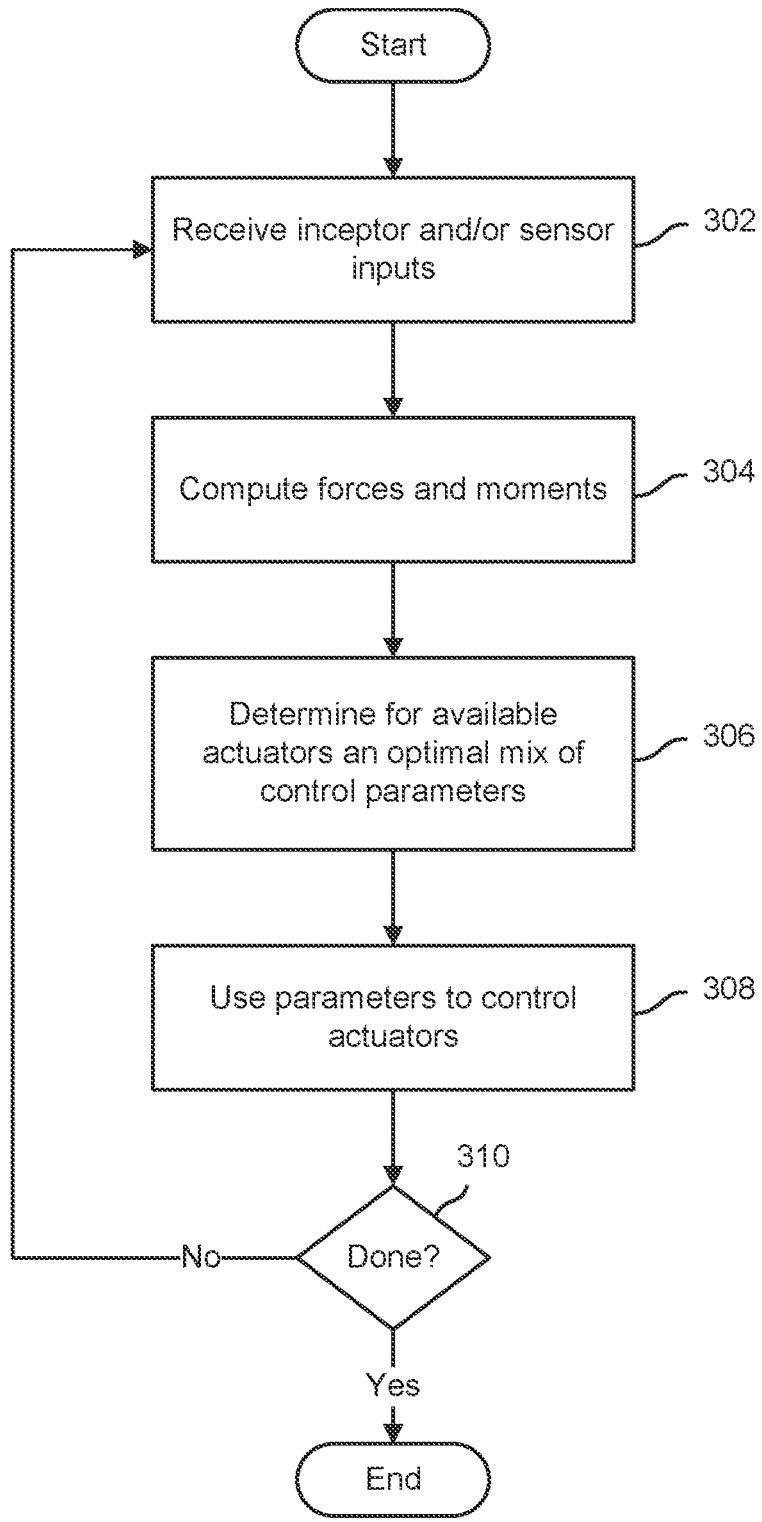
FIG. 3 is a flow chart illustrating an embodiment of a process to control flight.

FIG. 3 is a flow chart illustrating an embodiment of a process to control flight. In various embodiments, the process of FIG. 3 may be implemented by a flight control system, such as the flight control system 100 of FIG. 1. A set of inceptor inputs and/or sensor data is received (302). Forces and moments to be applied to the aircraft in response to the received inceptor inputs and/or sensor data are computed (304). An optimal set of currently available actuators, and for each a corresponding set of one or more actuator parameters, is determined to achieve (to an extent practical) the requested forces and moments (306). This vector of actuator commands is the optimal solution that minimizes a desired cost function in this specific set of conditions. The respective actuator parameters are used to control the corresponding actuators (308). Subsequent iterations are repeated until the flight control process is done (310), e.g., the aircraft lands and is shut down.

Figure 4:
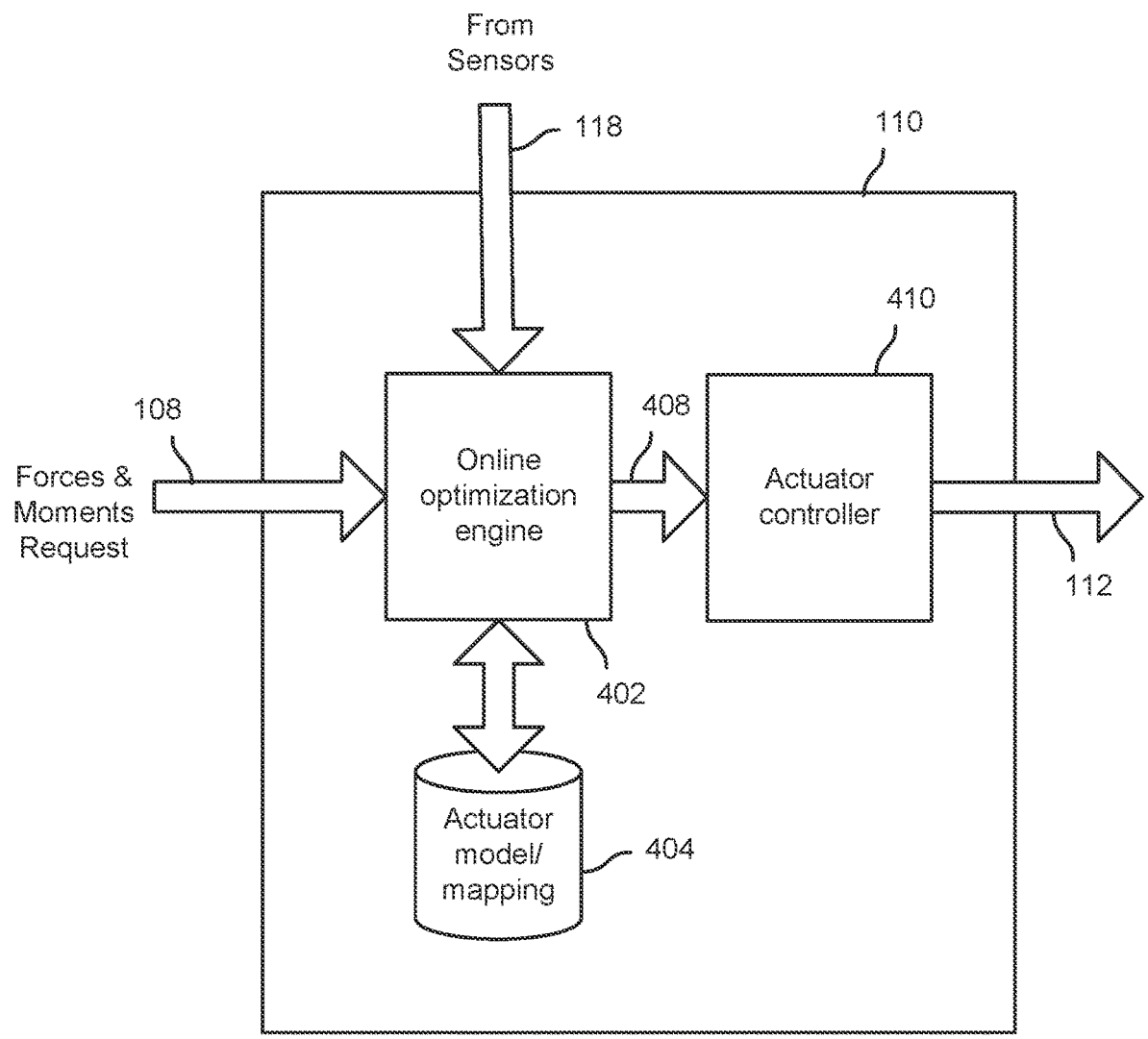
FIG. 4 is a block diagram illustrating an embodiment of an online optimization and mixing component of a flight control system.

FIG. 4 is a block diagram illustrating an embodiment of an online optimization and mixing component of a flight control system. In various embodiments, the online optimization and mixing component of FIG. 4 may be used to implement online optimizer/mixer 110 of FIG. 1. In the example shown, online optimizer/mixer 110 includes an online optimization engine 402 configured to receive requested forces and moments 108 and compute an optimal set of actuators and associated actuator parameters 408 to achieve (to an extent possible) the requested forces and moments 108 and minimizes the desired cost function. In the example shown, online optimization engine 402 uses an actuator model and/or effectiveness mapping 404 associated with the actuators available to be included in its solutions to achieve requested forces and moments 108. For example, the effective force(s) and moment(s) associated with a range of actuator parameters and/or under various conditions may be indicated in actuator model/mapping 404. In addition, sensor data 118 may be used to determine actuator effectiveness and/or otherwise to determine an optimal solution.

In some embodiments, online optimization engine 402 may determine a set of actuators available to be used to achieve requested forces and moments 108 based at least in part on sensor data 118. For example, lift fans may be considered less effective and/or unavailable above a certain airspeed, air temperature, etc. A lift fan may be considered to have less effect for a given actuator parameter value (e.g., power, current, rpm) based on air temperature, lift fan motor temperature, etc. In some embodiments, constraints such as maximum control surface deflection or maximum rotor RPM may be lowered at high dynamic pressures to limit loads on the structure.

Online optimization engine 402 provides an optimal solution (actuators and corresponding actuator parameters) 408 to actuator controller 410, which generates and distributes corresponding actuator control signals, commands, voltages, etc. 112 to the respective actuators.

In various embodiments, online optimization engine 402 may be a software module and/or process running on a special purpose or general purpose processor. In some embodiments, the elements shown in FIG. 4 may be integrated and incorporated into a flight controller, such as a flight control computer. In such an embodiment, forces and moments may or may not be computed as an intermediate step.

Figure 5:
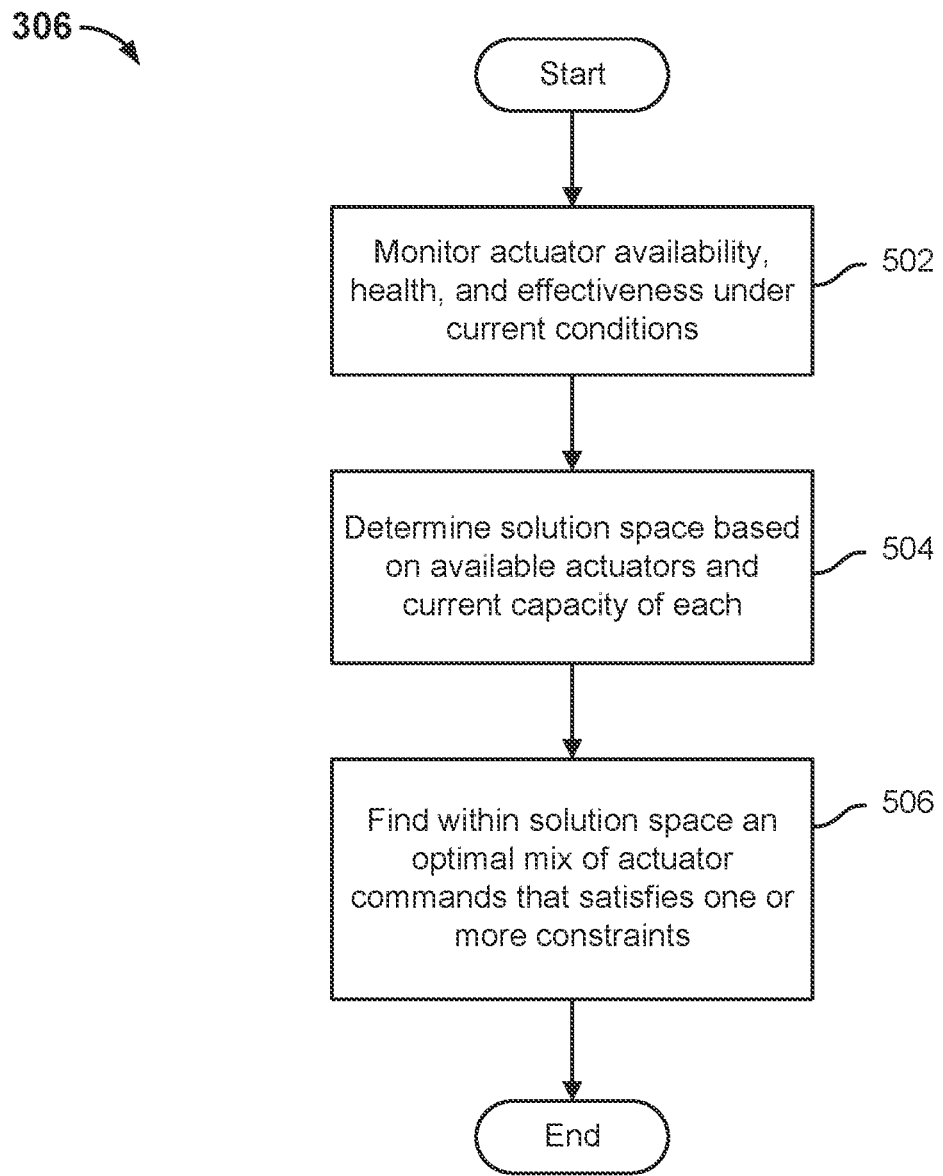
FIG. 5 is a flow chart illustrating an embodiment of a process to determine an optimal mix of actuators and associated parameters.

FIG. 5 is a flow chart illustrating an embodiment of a process to determine an optimal mix of actuators and associated parameters. In various embodiments, the process of FIG. 5 may be used to perform step 306 of the process of FIG. 3. In the example shown, actuator availability, health, and/or effectiveness under current conditions are monitored (502). For example, failure of one or more lift fans and/or other actuators, such as aerodynamic control surfaces, may be detected. In some embodiments, degradation in lift fan performance (e.g., maximum speed) may be measured, detected, and/or inferred from indirect indications, such as electric motor temperature, air temperature, air speed, etc. A solution space within which an optimal set of available actuators and corresponding actuator parameters is to be found is determined (504). For example, a solution space that takes into account which actuators are available (e.g., haven't failed, aren't excluded from use due to current air speed, etc.) and for each a minimum and/or maximum command is determined.

The solution space may be defined at least in part by one or more constraints. For example, a maximum power constraint may be enforced to avoid damaging circuitry, batteries, power supplies, etc. and/or to avoid or minimize excessive drain on battery power. Other examples of constraints may include minimize collective thrust of a set of lift fans, e.g., by way of ensuring a solution that minimizes power consumption is determined. In various embodiments, any constraint capable of being expressed or approximated may be enforced. In an embodiment where the solver uses linear relationships, any linear constraint can be enforced. Many non-linear constraints can also be approximated by linear or linear-by-part approximations.

An optimal mix of actuators and associated parameters, i.e., a mix that minimizes a desired cost function, is found within the solution space (506). In various embodiments, if the requested forces and moments can be satisfied fully without violating any constraint can be found, then such a solution that minimizes a secondary part of the cost function is determined and returned. In some embodiments, the control mix optimization problem is modeled as a quadratic program. In various embodiments, the objective of the quadratic program is to minimize a weighted $1^2$-norm of the error between the requested forces and moments vector $F_{cmd}$ and a returned vector $F_{ret}$ returned by the online optimizer/mixer. In various embodiments, the 2-norm of a vector of torque values is sought to be minimized on top as the error between desired forces and moments and realized forces and moments, which has the effect of finding a solution that approximates minimum power consumption and more likely distributes torque among lift fans than pushes one or a few lift fans to maximum torque. In various embodiments, a minimum and maximum torque and/or RPM of each respective lift fan is enforced as a constraint.

In some embodiments, the cost function can penalize, at the same time, errors in achieved forces and moments compared to desired inputs and regularizing terms that tend to make the allocation as uniform as possible across actuators. In the case of a linear over-actuated problem where there are more independent actuators than the number of input forces and moments, the regularizing term can be the L2 norm of the projection of the actuation vector in the null space of the linear actuation to force/moment function. The foregoing approach penalizes uneven distribution across actuators in a way that does not affect the optimality of the force and moment realization.

In various embodiments, different weights may be assigned to different errors, e.g., to reflect the relative importance of certain axes or other considerations over others. In this context, with respect to a given solution for a given set of commanded forces and moments, $F_{cmd}$, an "error" is defined as a difference (or distance) between the commanded force and moment vector and the corresponding returned force and moment vector expected to be achieved by the solution returned by the online optimization. In some embodiments, the weighted square of each respective error term is included in the cost function, and the optimizer seeks to minimize the sum of those terms. Different weights may be assigned to different errors to established desired priorities. In some embodiments, weights may be assigned as follows: Fx: 100, Fz: 10, Mx: 1000, My: 1000, and Mz: 1 Weights established as in the foregoing example would prioritize controlling in the x-y plane over other considerations, for example, by giving relatively much higher weight to errors with respect to the Mx and My terms.

In various embodiments, formulating the optimization problem as a quadratic program enables an optimal solution to be computed online in response to pilot manipulation of inceptors and/or inputs generated by an automated pilot and/or sensor information. In various embodiments, formulating the optimization as a quadratic program enables converging to an optimal solution within a flight control cycle time (e.g., 10 msec in the case the controller framerate is 100 Hz). Some prior approaches computed actuation mixes offline for various sets of inputs, but such solutions typically did not find a true optimal solution (minimum cost) in any given real world set of inputs and conditions. Online approximate optimization approaches are believed to have been attempted using other objective functions and other techniques, such as a pseudo-inverse or cascaded pseudo-inverse approach, which would minimize the L2 norm of the solution to a linear set of equations. However, the pseudo-inverse approach does not handle the case in which one or more actuators (e.g., lift fans) reach an upper limit of their capacity/effectiveness, a condition sometimes referred to herein as "saturation". Cascaded pseudo-inverse is a heuristic that attempts to mitigate that problem, but it does not provide an actual optimal solution. In contrast to prior approaches, the quadratic program/least squares approach disclosed herein, in which different weights are applied to give priority to certain axes when one or more actuators are saturated, and which allows constraints to be defined and enforced, enables a workable optimal solution to be computed online within the required cycle time even under saturation or actuator failure conditions.

Figure 6:
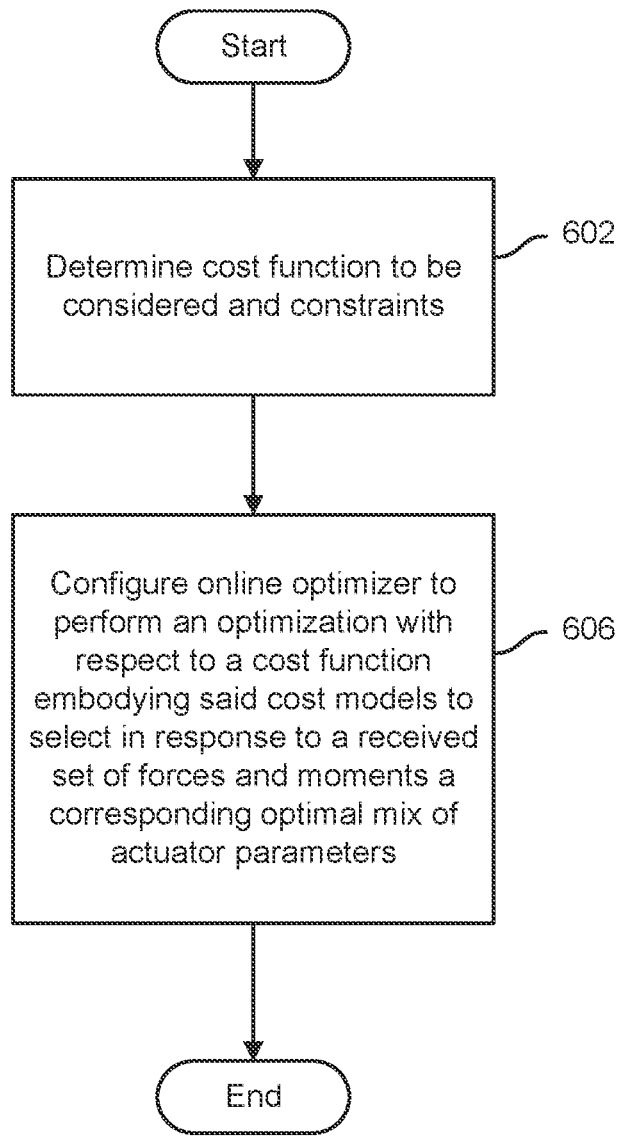
FIG. 6 is a flow chart illustrating an embodiment of a process to configure a flight control system.

FIG. 6 is a flow chart illustrating an embodiment of a process to configure a flight control system. In various embodiments, the process of FIG. 6 may be performed to configure an online optimization component, such as online optimizer/mixer 110 of FIG. 1. In the example shown, the cost function to be considered to perform online optimization of a flight control solution and applicable constraints are determined (602). Examples of costs to be considered include, without limitation, power consumption, errors between commanded and returned forces and moments, actuator change rate, etc. In some embodiments in which a quadratic program method is used, each cost is modeled using one or more linear terms, resulting in corresponding quadratic (squared) terms in the optimization problem. In some embodiments, a minimum of the cost/objective function can be determined applying a least squares approach, such as the approach described in P. B. Stark and R. L. Parker, "Bounded-Variable Least-Squares: an Algorithm and Applications," Computational Statistics 10:129-141 (1995). An online optimizer is configured to perform a least square (or other) optimization with respect to a cost (or other "objective") function and associated constraints embodying the determined cost model(s) to select in response to a received set of commanded forces and moments a corresponding optimal mix of actuators and associated actuator parameters (606). Many other optimization algorithms can be used instead of BVLS to solve a linear quadratic programming problem.

Figure 7:
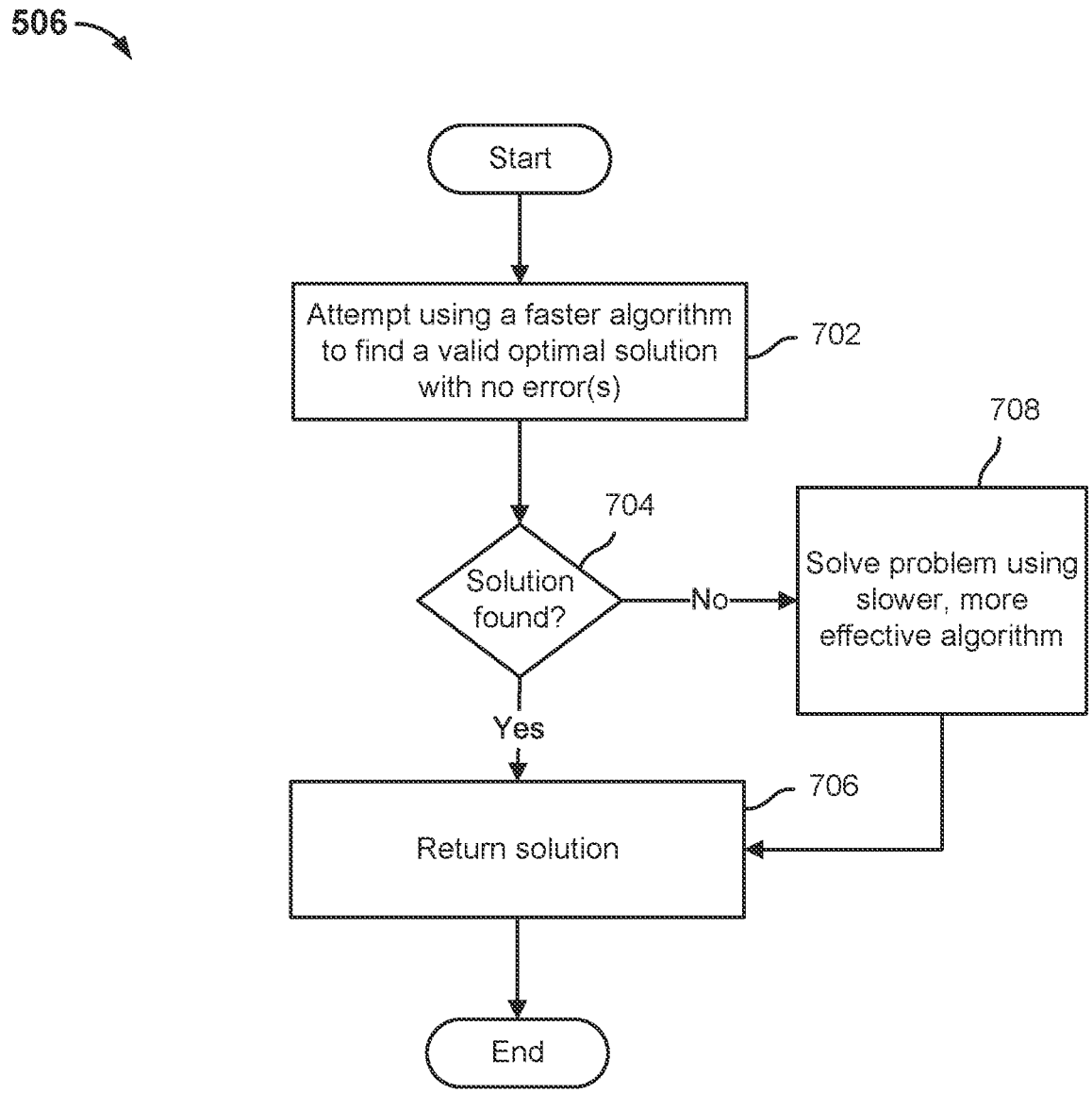
FIG. 7 is a flow chart illustrating an embodiment of a process to find an optimal control flight solution.

FIG. 7 is a flow chart illustrating an embodiment of a process to find an optimal control flight solution. In various embodiments, the process of FIG. 7 may be used to perform step 506 of the process of FIG. 5. In the example shown, an attempt to find a valid optimal flight control solution with no error(s) is made (702) using a fast, less advanced algorithm. For example, an attempt may be made to find using a pseudo-inverse approach a solution that satisfies all commanded forces and moments and satisfies all constraints (e.g., on available lift fan RPM). If a valid solution with no error(s) is found (704), the solution is returned (706) and implemented, e.g., by distributing associated commands and/or parameters to the respective actuators. If a valid solution that satisfies all commanded forces and moments is not found by the faster, simpler algorithm, a valid solution is found using a slower optimization algorithm (708).

In various embodiments, a single stage of optimization is used to minimize several costs. For example, in some embodiments, the following formulation may be used:

$$\min_c \left\| \sqrt{W} \left( F_{ret}(c) - F_{cmd} \right) \right\|_2 + \rho \|c\|_2$$

$$\text{subject to } 0 \leq c_i \leq c_{max}, i = 1 \ldots n$$

In which,

W represents the respective weights assigned to different axes;

$F_{ret}$ is the returned forces and moments;

$F_{cmd}$ is the requested forces and moments;

c represents the respective torque commands to each lift fan; and $\rho$ is a weight to favor uniform allocation over all actuators.

Figure 8:
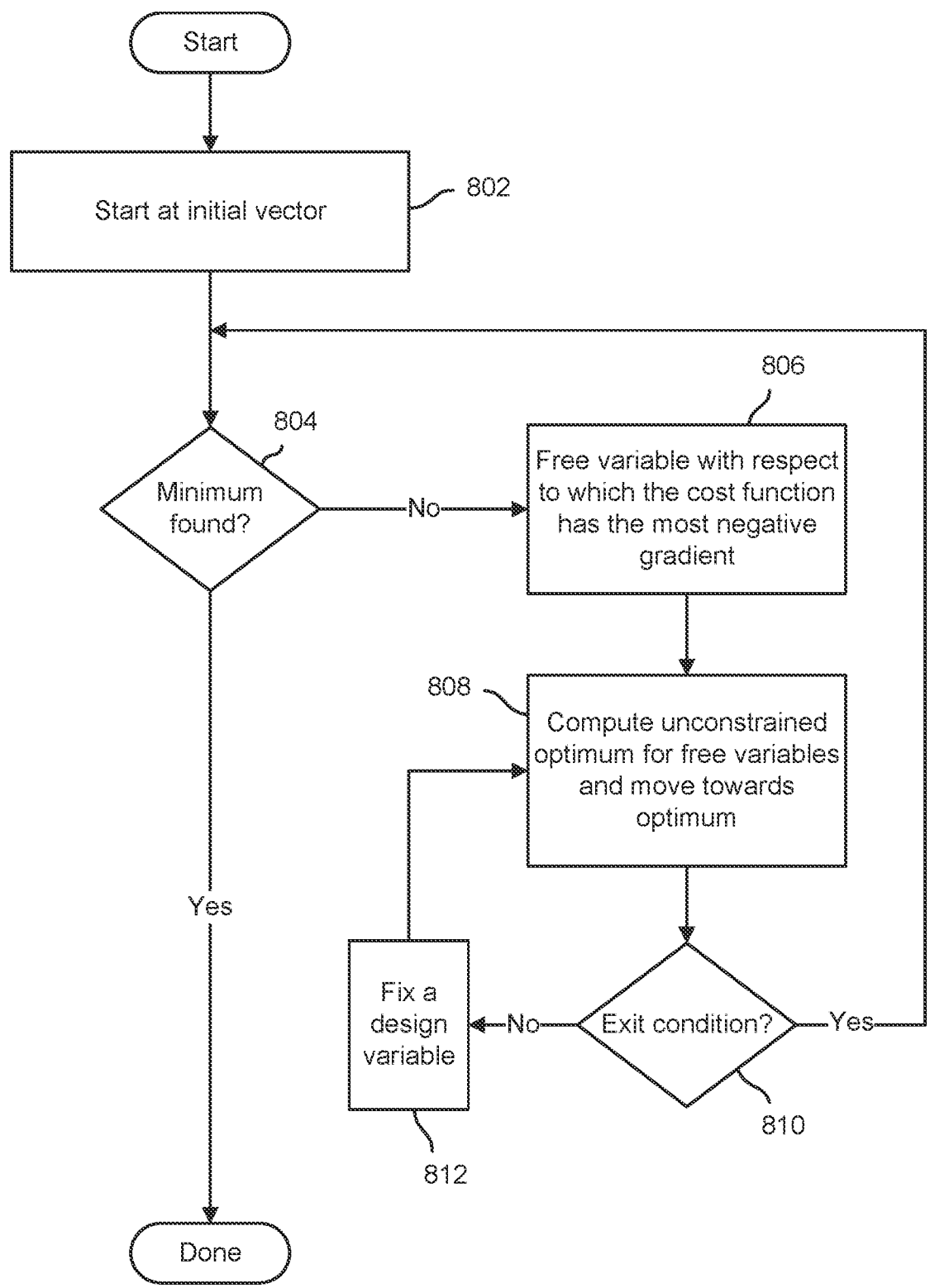
FIG. 8 is a flow chart illustrating an embodiment of a process to find an optimal control flight solution using BVLS.

FIG. 8 is a flow chart illustrating an embodiment of a process to find an optimal control flight solution using BVLS. In various embodiments, the process of FIG. 8 may be implemented by an online optimizer of a flight control system, such as online optimizer/mixer 110 of FIG. 1. In the example shown, processing starts at an initial vector (802). For example, a starting point at which all are set to a lower bound may be selected and/or configured as a starting point. Another possibility is to start the algorithm using the solution from the previous control cycle. It is determined whether a minimum (optimal solution) has been found (804). In various embodiments, a negative gradient is computed and the Kuhn-Tucker test for convergence is checked to determine whether a minimum has been found. In some embodiments, it may be determined that a minimum has been found if residual values are small enough to consider the convergence test to be satisfied. If a minimum is determined to have been found (804), the solution is returned and the process of FIG. 8 ends. If a minimum has not been found (804), the variable with respect to which the cost function has the most negative gradient is freed (806). Next, an inner processing loop (808, 810, 812) is performed in which in each iteration an unconstrained optimum is computed with respect to variables in a "free" (not yet bounded) set and the process moves towards the determined optimum (808) until an exit condition to exit the inner loop is satisfied (810). In some embodiments, an exit condition to exit the inner loop (808, 810) may be determined to have been satisfied if the computed unconstrained optimum determined at step 808 is determined to be entirely within bounds or once the process has moved toward the unconstrained optimum there are no more free variables. Referring further to FIG. 8, the inner loop may be performed through successive iterations until a minimum is determined to have been found (804).

Figure 9:
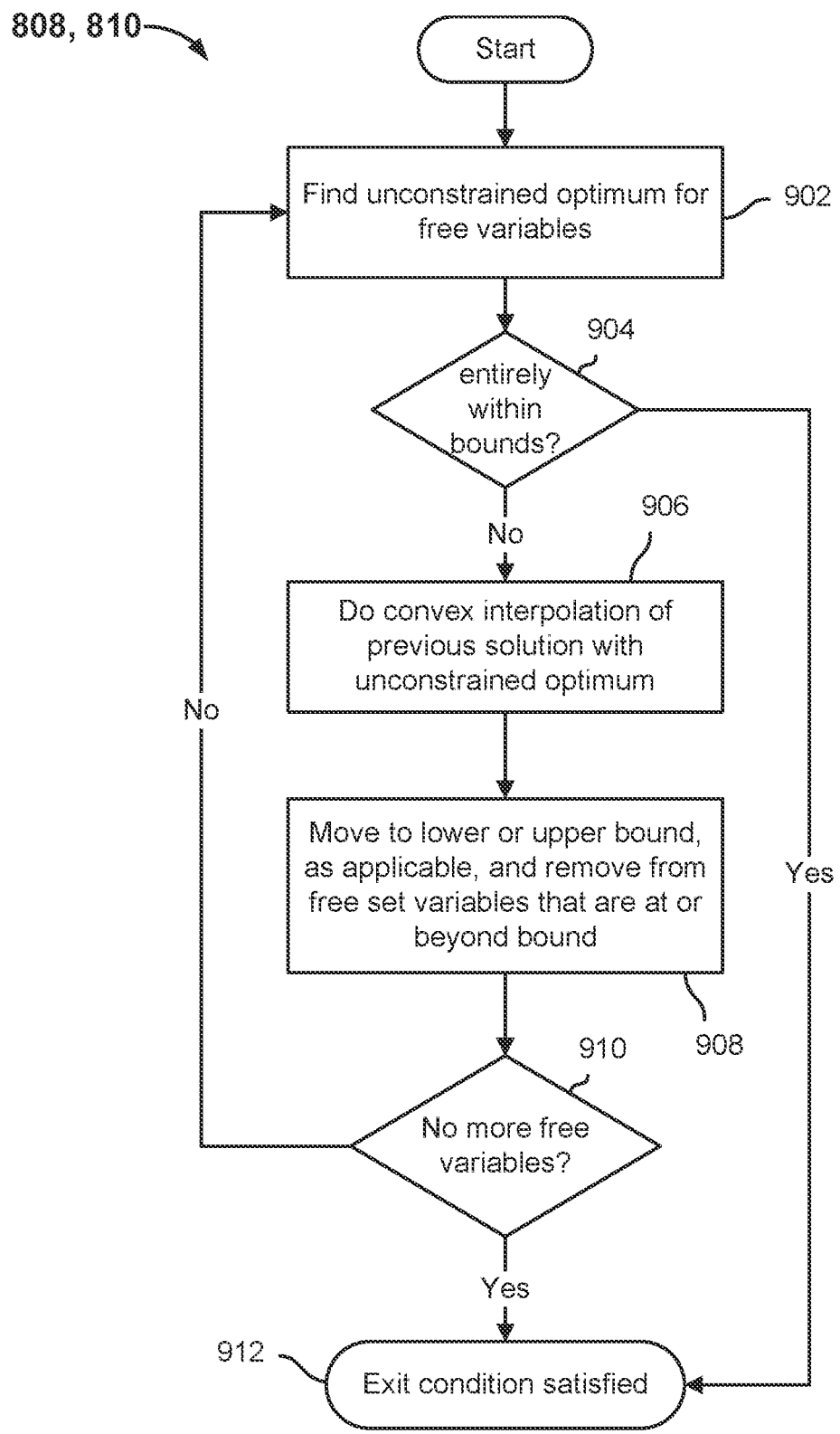
FIG. 9 is a flow chart illustrating an embodiment of a process to find an optimal control flight solution.

FIG. 9 is a flow chart illustrating an embodiment of a process to find an optimal control flight solution. In various embodiments, the process of FIG. 9 may be performed to implement steps 808 and 810 of FIG. 8. In the example shown, an unconstrained optimum for free variables is found (902). If the unconstrained optimum is entirely within bounds of the solution space (904), an exit condition it determined to have been satisfied (912). If the optimum is not entirely within bounds (904), a convex interpolation of a previously-computed solution with the unconstrained optimum is determined (906) and any variables that are at or beyond a bound are moved to the applicable bound (and removed from the free set) (908). If there are no more free variables (910), it is determined that an exit condition is satisfied and the process of FIG. 9 ends (912). If once variables at or beyond their bound have been moved to their bounds (906, 908) there are remaining free variables (910), an unconstrained optimum for the free variables is found (902) and processing continues as described above (904, 906, 908, 910).

In various embodiments, an online optimizer may be configured to determine an optimal solution by executing computer instructions on a processor, for example computer instructions to implement the processing steps described above with reference to FIGS. 8 and 9.

While in some embodiments described herein a bounded-value least squares (BVLS) approach is used to find an optimal mix of actuators and associated parameters, in various embodiments other optimization techniques may be used to find an optimal solution. For example, "active set" techniques other than BVLS may be used. In various embodiments, optimization techniques such as one or more of gradient descent, sequential quadratic programming (SQP), and/or simplex methods may be used. In various embodiments, any optimization technique suitable to solve an optimization problem subject to one or more constraints may be used.

In various embodiments, techniques disclosed herein may be used to provide flight control via online optimization. A true optimal combination of actuators and associated parameters to achieve a requested set of forces and moments, to an extent practical, may be determined. In some embodiments, by modeling costs as a quadratic program, a least squares approach may be used to converge on an optimal solution within a required cycle time.

In various embodiments, optimization is described as being performed online. In some alternative embodiments, optimization as disclosed herein may be achieved at least to a degree via offline processing. For example, in some embodiments, optimization techniques disclosed herein may be used to precompute optimal solutions, e.g., to precompute combinations of actuators and parameters for each to achieve a corresponding set of forces and moments that would minimize a desired cost function, as described above being done via online optimization. Optimal solutions could be precomputed offline for a large number of permutations of inputs and resulting solutions stored in a lookup table or other data structure.

In various embodiments, precomputing optimal solutions may achieve desired or acceptable results, and may in some cases achieve a desired balance of performance and resource consumption and/or requirements. For example, depending on the number of inputs (e.g., inceptor inputs, environmental conditions affecting actuator effectiveness and/or constraints, actuator loss/failure, context-dependent constraints, such as limits to rates and/or deflection that change with speed, etc.), the dimensionality of the resulting lookup data structure may become too high for lookups to be performed within acceptable cycle times. At lower dimensionality, offline optimization may consume more memory but require less computational time during flight. However, offline optimization may become impractical at higher dimensionality.

In some cases, external requirements, such as certification, may mitigate in favor of precomputing and storing optimal solutions. Precomputing and storing optimal solutions may require more memory, as compared to online optimization, and there may be some loss in accuracy, since optimal solutions would be pre-computed only for a finite number of permutations of inputs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft comprising:
an airframe comprising a fuselage, a left wing attached to the fuselage, a right wing attached to the fuselage, and a tail structure;
actuators coupled with the airframe, wherein the actuators comprise lift fans, a left wing aileron mounted to the left wing, a right wing aileron mounted to the right wing, an elevator mounted to the tail structure, and a rudder mounted to the tail structure, wherein two or more of the lift fans are attached to the left wing, and wherein two or more of the lift fans are attached to the right wing;
a propeller driven by one of the actuators and configured to propel the aircraft in a forward direction of the aircraft;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the set of flight control parameters based on the sensor data to compute an optimal mix of the actuators and associated actuator parameters for use in applying the set of forces and moments to the aircraft; and
control the optimal mix of the actuators based on the associated actuator parameters to apply the set of forces and moments to the aircraft.

2. The aircraft of claim 1, wherein the set of flight control parameters defines the set of forces and moments to be applied to the aircraft.

3. The aircraft of claim 1, wherein:
the left wing comprises a first left wing pylon, a second left wing pylon, and a third left wing pylon;
the right wing comprises a first right wing pylon, a second right wing pylon, and a third right wing pylon;
two of the lift fans are attached to the first left wing pylon;
two of the lift fans are attached to the second left wing pylon;
two of the lift fans are attached to the third left wing pylon;
two of the lift fans are attached to the first right wing pylon;
two of the lift fans are attached to the second right wing pylon; and
two of the lift fans are attached to the third right wing pylon.

4. The aircraft of claim 1, wherein the flight controller is configured to:
process the sensor data to determine a current state of the aircraft;
determine an availability and effectiveness of each of two or more of the actuators in the current state of the aircraft; and
compute the optimal mix of the actuators and associated actuator parameters based on the availability and effectiveness of each of the two or more of the actuators in the current state of the aircraft.

5. The aircraft of claim 4, wherein the current state of the aircraft is indicative of one or more of:
an airspeed of the aircraft;
an attitude of the aircraft; and
an altitude of the aircraft.

6. The aircraft of claim 5, wherein the sensor data is indicative of one or more environmental conditions of the aircraft.

7. The aircraft of claim 5, wherein the sensor data is indicative of one or more of:
an availability of each of two or more of the actuators;
a failure status of each of two or more of the actuators; and
an operational status of each of two or more of the actuators.

8. The aircraft of claim 4, wherein flight controller determines the optimal mix of the actuators and associated actuator parameters in real time.

9. An aircraft comprising:
an airframe;
actuators coupled with the airframe, wherein the actuators comprise lift fans;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the sensor data to determine a current state of the aircraft;
determine an availability and effectiveness of each of two or more of the actuators in the current state of the aircraft at least partially via one or more models of the actuators;
process the set of flight control parameters based on the sensor data to compute an optimal mix of the actuators and associated actuator parameters based on the availability and effectiveness of each of the two or more of the actuators in the current state of the aircraft for use in applying the set of forces and moments to the aircraft; and
control the optimal mix of the actuators based on the associated actuator parameters to apply the set of forces and moments to the aircraft.

10. An aircraft comprising:
an airframe;
actuators coupled with the airframe, wherein the actuators comprise lift fans;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the sensor data to determine a current state of the aircraft;
determine an availability and effectiveness of each of two or more of the actuators in the current state of the aircraft at least partially via a lookup data table mapping availability and effectiveness of each of two or more of the actuators to the sensor data;
process the set of flight control parameters based on the sensor data to compute an optimal mix of the actuators and associated actuator parameters based on the availability and effectiveness of each of the two or more of the actuators in the current state of the aircraft for use in applying the set of forces and moments to the aircraft; and
control the optimal mix of the actuators based on the associated actuator parameters to apply the set of forces and moments to the aircraft.

11. An aircraft comprising:
an airframe;
actuators coupled with the airframe, wherein the actuators comprise lift fans;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the sensor data to determine a current state of the aircraft;
determine an availability and effectiveness of each of two or more of the actuators in the current state of the aircraft at least partially based on one or more constraints regarding operation of the actuator;
process the set of flight control parameters based on the sensor data to compute an optimal mix of the actuators and associated actuator parameters based on the availability and effectiveness of each of the two or more of the actuators in the current state of the aircraft for use in applying the set of forces and moments to the aircraft; and
control the optimal mix of the actuators based on the associated actuator parameters to apply the set of forces and moments to the aircraft.

12. The aircraft of claim 11, wherein the one or more constraints comprise one or more of:
minimum rotation speed;
maximum rotation speed;
maximum torque;
minimum deflection angle;
maximum deflection angle;
maximum rate of change of rotation speed;
maximum rate of change of torque; and
maximum rate of change of deflection angle.

13. The aircraft of claim 11, wherein the one or more constraints comprise a maximum power constraint.

14. An aircraft comprising:
an airframe;
actuators coupled with the airframe, wherein the actuators comprise lift fans;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the sensor data to determine a current state of the aircraft;
determine an availability and effectiveness of each of two or more of the actuators in the current state of the aircraft;
process the set of flight control parameters based on the sensor data to compute an optimal mix of the actuators and associated actuator parameters based on the availability and effectiveness of each of the two or more of the actuators in the current state of the aircraft for use in applying the set of forces and moments to the aircraft, wherein the optimal mix of actuators and associated actuator parameters are determined by solving a cost function to minimize a cost associated with operation of the actuators, and wherein the cost function comprises squared terms resulting from modeling each cost using one or more linear terms corresponding to the current state of the aircraft; and
control the optimal mix of the actuators based on the associated actuator parameters to apply the set of forces and moments to the aircraft.

15. The aircraft of claim 14, wherein the cost function is configured to minimize total power consumption of the actuators.

16. The aircraft of claim 14, wherein the flight controller is configured to:
attempt to find a solution that minimizes the cost function using a first algorithm; and
use a second algorithm to find the solution that minimizes the cost function in response to not finding the solution that minimizes the cost function using the first algorithm, wherein the first algorithm is faster than the second algorithm.

17. The aircraft of claim 14, wherein the flight controller is configured to find a solution that minimizes the cost function using a least squares approach.

18. An aircraft comprising:
an airframe comprising a fuselage, a left wing attached to the fuselage, and a right wing attached to the fuselage, wherein the left wing comprises a first left wing pylon, a second left wing pylon, and a third left wing pylon, and wherein the right wing comprises a first right wing pylon, a second right wing pylon, and a third right wing pylon;
actuators coupled with the airframe, wherein the actuators comprise lift fans, wherein two of the lift fans are attached to the first left wing pylon, two of the lift fans are attached to the second left wing pylon, two of the lift fans are attached to the third left wing pylon, two of the lift fans are attached to the first right wing pylon, two of the lift fans are attached to the second right wing pylon, and two of the lift fans are attached to the third right wing pylon;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the set of flight control parameters based on the sensor data to compute an optimal mix of the actuators and associated actuator parameters for use in applying the set of forces and moments to the aircraft; and
control the optimal mix of the actuators based on the associated actuator parameters to apply the set of forces and moments to the aircraft.

19. The aircraft of claim 18, wherein the flight controller is configured to:
process the sensor data to determine a current state of the aircraft;
determine an availability and effectiveness of each of two or more of the actuators in the current state of the aircraft; and
compute the optimal mix of the actuators and associated actuator parameters based on the availability and effectiveness of each of the two or more of the actuators in the current state of the aircraft.

20. The aircraft of claim 19, wherein the current state of the aircraft is indicative of one or more of:
an airspeed of the aircraft;
an attitude of the aircraft; and
an altitude of the aircraft.

21. The aircraft of claim 20, wherein the sensor data is indicative of one or more environmental conditions of the aircraft.

22. The aircraft of claim 20, wherein the sensor data is indicative of one or more of:
an availability of each of two or more of the actuators;
a failure status of each of two or more of the actuators; and
an operational status of each of two or more of the actuators.

23. An aircraft comprising:
an airframe;
actuators coupled with the airframe, wherein the actuators comprise lift fans;
sensors via which sensor data is generated, wherein the sensor data is indicative of one or more current operational parameters of the aircraft; and
a flight controller configured to:
receive a set of flight control inputs;
generate a set of flight control parameters indicative of a set of forces and moments to be applied to the aircraft based on the set of flight control inputs;
process the sensor data to determine a current state of the aircraft;
determine an availability and effectiveness of each of two or more of the actuators in the current state of the aircraft;
process the set of flight control parameters based on the sensor data to compute an optimal mix of the actuators and associated actuator parameters based on the availability and effectiveness of each of the two or more of the actuators in the current state of the aircraft for use in applying the set of forces and moments to the aircraft, wherein the optimal mix of actuators and associated actuator parameters are determined by solving a cost function to minimize a cost associated with operation of the actuators;
attempt to find a solution that minimizes the cost function using a first algorithm;
use a second algorithm to find the solution that minimizes the cost function in response to not finding the solution that minimizes the cost function using the first algorithm, wherein the first algorithm is faster than the second algorithm; and
control the optimal mix of the actuators based on the associated actuator parameters to apply the set of forces and moments to the aircraft.

24. The aircraft of claim 23, wherein the cost function is configured to minimize total power consumption of the actuators.

25. The aircraft of claim 23, wherein the flight controller is configured to find a solution that minimizes the cost function using a least squares approach.

* * * * *